C. A. LIEB.
SUSPENSION SPRING SYSTEM FOR AUTOMOBILES.
APPLICATION FILED DEC. 3, 1908.
933,997.
Patented Sept. 14, 1909.
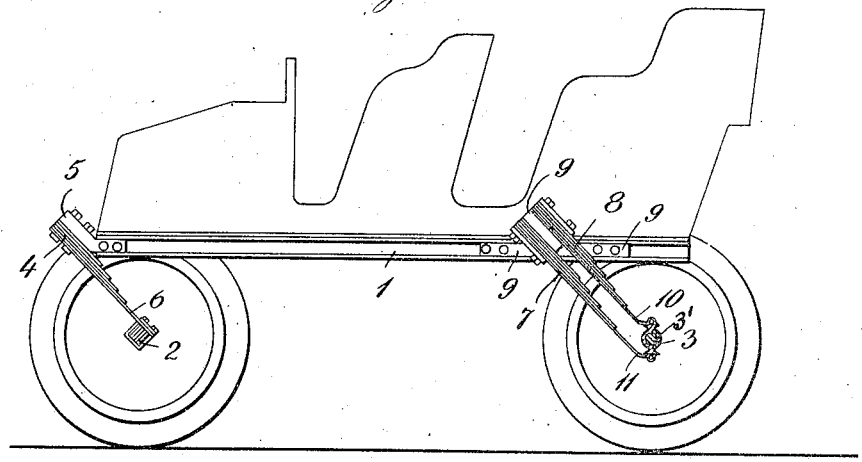
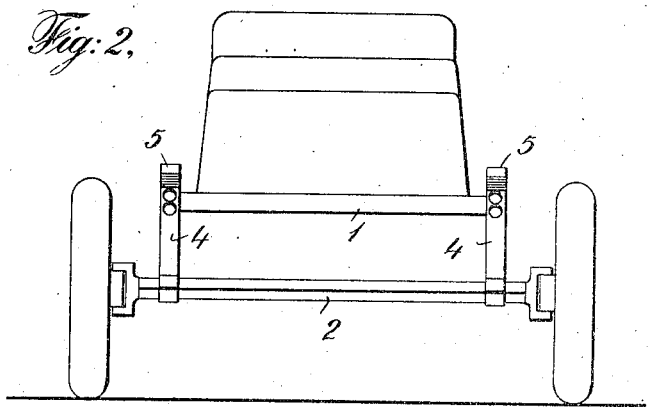
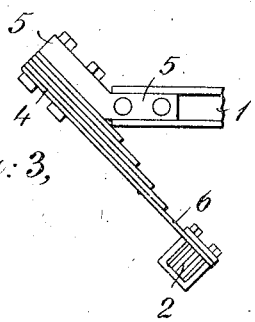
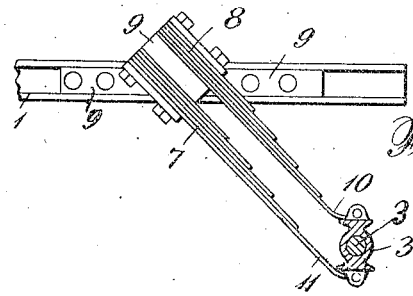
Witnesses:
Max B. A. Doring
F. M. Dousbach
Inventor,
Charles A. Lieb.
By his Attorney
Phillips Abbott

UNITED STATES PATENT OFFICE.

CHARLES A. LIEB, OF NEW YORK, N. Y.

SUSPENSION-SPRING SYSTEM FOR AUTOMOBILES.

933,997.　　　　　　Specification of Letters Patent.　　Patented Sept. 14, 1909.

Application filed December 3, 1908.  Serial No. 465,794.

*To all whom it may concern:*

Be it known that I, CHARLES A. LIEB, a citizen of the United States, and a resident of the borough of Manhattan, city, county, and State of New York, have invented a new and useful Improvement in Suspension-Spring Systems for Automobiles, of which the following is a specification, reference being had to the accompanying drawings, in which—

Figure 1 illustrates a diagrammatical sidewise elevation of portions of an automobile showing the essentials of the invention; Fig. 2 illustrates a front view or elevation of that which is shown in Fig. 1; Fig. 3 illustrates a view the same as Fig. 1, in which one of the springs used at the front axle is shown enlarged; Fig. 4 illustrates a view the same as Fig. 1 in which one of the double springs used at the rear axle is shown enlarged.

It will be understood that the drawings illustrate only such of the parts as are desirable for a clear understanding of the invention. Structural details are omitted.

The springs of automobiles, as heretofore used, have almost invariably been arranged in such manner that their axes are parallel with the axis of the vehicle, so that the line of direct compression of the springs would be a vertical one. When an automobile, supported upon such a spring system and moving at a speed of thirty or forty miles an hour, encounters the usual road depression, elevations or obstructions which produce shocks greater than can be readily absorbed by the pneumatic tires, a change in the direction of movement of the body or chassis of the automobile, as well as of the passengers is the result, because they no longer move in the same plane as the general surface of the road, on the contrary, are deflected downwardly or upwardly therefrom, and this produces a wrenching strain upon the springs and a tendency to arrest the forward movement of the body or chassis, because the springs are applied thereto in such manner as to prevent such movement when the forward movement of the wheels is arrested. Moreover the strain does not come upon the springs in such lines as to squarely or directly compress them; on the contrary, they receive a partial endwise thrust, tending to tear them from the body or chassis and to separate the forward ends of the leaves of the springs, thus, not only inducing fracture of some part of the structure, but also the frictional or breaking contact between the leaves at the time when most needed is impossible because of their separation. In this way severe strains arise upon the mechanical parts involved as well as upon the tires and the continued forward movement of that part of the vehicle supported above the springs is impeded. These results, taken together are not only injurious upon the mechanism, tending to loosen the joints, crack the paint, and generally rack the structure, but also make the riding rough and disagreeable.

The momentum of an automobile moving rapidly in a horizontal direction cannot suddenly be changed to a vertical movement without severely disturbing both passengers and the vehicle, hence it is customary to construct the seats of touring cars with upholstery high in front; also foot braces are frequently provided, so that the passengers may brace themselves in their seats to resist the impulses referred to.

Under my invention I so dispose the springs relative to the body or chassis that when depressions, elevations or obstructions are encountered, the direction of the pressure upon the springs will be at substantially right angle to their axes, whereby the body of the vehicle is allowed to still progress, because of the compression of the springs, while the forward progression of the wheels has been temporarily retarded. I have found that these results are best obtained when the springs are so arranged relative to the body or chassis that their respective axes lie at an angle of substantially forty five degrees relative to each other. In this way roughness in riding and likewise wrenching strains upon the structure are avoided, and the tendency to unseat the passengers is greatly reduced.

Referring to the drawings, in Figure 1, I show a side elevation of such parts of an automobile as are necessary for an understanding of the invention, and I illustrate two forms of axle and two forms of spring. I do this in order that the same figure may illustrate two methods in which the springs may be made, that shown at the rear axle having the advantage that it prevents the axle from turning. It will be at once understood however that either form of spring may be used upon both axles, provided the construction of the other parts be such as to permit of this.

1 represents one of the main sidebars of the chassis of an automobile, 2 the front axle, 3 the rear axle, 3' the sleeve therefor, 4 a quarter elliptic spring made up of a series of flat leaves which is rigidly bolted at its upper end to a bracket 5 riveted or bolted to the chassis as shown. The lower or free end 6 of these front springs is rigidly bolted or clipped in any suitable manner to the front axle 2. I prefer to make the springs at the rear axle duplex in form, that is to say, with two lead springs 7 and 8, each made up of a series of flat leaves, the same as the spring 4, both sets being bolted to a bracket 9 which is riveted, or bolted or otherwise formed upon the chassis as shown. The object in having the rear spring a duplex spring is so that the free end, 10 and 11 respectively, of the springs may connect through a pivotal connection with the upper and lower edges of the rear axle, so that that axle or rather the sleeve 3', will be maintained in a fixed position and prevented from turning. The construction of these springs is best illustrated in Figs. 3 and 4, where the parts are somewhat enlarged.

Attention is called to the fact that by arranging the springs at an angle of substantially forty five degrees relative to the axis of the chassis, one end or side of the spring being rigidly attached thereto, the other or free end engaging with the axles and which are the only means whereby the axles are supported, and held in place, that I secure a series of very important results:

First: The springs will be more fully compressed when obstructions are encountered because the strains come upon them in lines at right angles to their axes, in other words, in lines best adapted to the compression of the springs, without distorting them, and that thereby greater ease in riding and increased frictional movement between the leaves composing the springs during their compression is secured, thus violent rebounds are avoided and smoothness and comfort in riding is secured.

Second: Since there is not so great tendency to rebound when obstructions are encountered and the traction is increased because of better road contact being maintained. Consequently there will be less wear upon the tires because there is reduced tendency to skid and beat.

Third: By actual tests with a Packard car weighing approximately 3800 pounds, equipped with the improved springs, the fact has been demonstrated that the so-called solid rubber tires afford substantially as comfortable riding as pneumatic tires employed with the old method of spring suspension, the objectionable jar and rattling of loose parts noticeable in automobiles equipped with solid rubber tires and having the old method of spring suspension being obviated.

Fourth: Owing to the fact that the springs are connected with the axles or running gear at their freely movable or flexible ends, there is no rigid control of the axle, on the contrary, they are resiliently supported against movement in all directions, up or down or sidewise or at any intermediate angle. The sidewise movement which is permitted by the twisting of the springs is of course limited as compared with the up or down or compressing movements, nevertheless sidewise movements are permitted, and this is of great importance because it is sufficient to materially relieve the machine from shocks incidental to sidewise contact against obstructions.

Fifth: Owing to the fact that the springs are arranged at a rearward angle of substantially forty five degrees, the rear axle may be located farther to the rear than under the old forms of spring suspension, thus considerably increasing the wheel base without increasing the over all length of the vehicle. From this results several important advantages, easier riding, better control, less wear on the tires, less liability to skid, longer foot board and wider doors.

It will be obvious to those who are familiar with such matters that the essence of this invention may be embodied in constructions which differ materially, so far as the details are concerned, from that illustrated and described herein, which is intended to show only the general features involved in the invention.

I claim:

1. In an automobile, a pair of axles, a chassis, a body supported directly upon the chassis, flat metal springs arranged in separated sets at approximately opposite ends of the chassis, each spring being rigidly connected to the chassis at one end and engaging with one of the axles at the other end, all the springs being disposed at a downward and rearward angle of approximately forty five degrees relative to the axial line of the chassis.

2. In an automobile, a pair of axles, a chassis, a body supported directly upon the chassis, flat metal springs arranged in separated sets at approximately opposite ends of the chassis, each spring being rigidly connected to the chassis at one end and engaging with one of the axles at the other end, all the springs being disposed at a downward and rearward angle of approximately forty five degrees relative to the axial line of the chassis, the engagement of the springs with the rear axle being at the upper and lower sides of the latter.

3. In an automobile, a pair of axles, a chassis, a body supported directly upon the chassis, flat metal springs arranged in separated sets rigidly connected with the chassis at their butt ends and interposed between it and the axles respectively at an angle of substantially forty five degrees relative to the axis of the chassis, so that the axles are supported by the free ends of the springs, all of the springs being in substantially parallel planes, whereby when the springs are compressed, the axles will move rearwardly and toward the chassis.

4. In an automobile, a chassis, a body supported on the chassis, axles therefor, springs arranged in separated sets at approximately opposite ends of the chassis and rigidly connected thereto in advance of the axles, the free or resilient ends of the sets of springs extending downwardly to the axles, whereby alone the axles are controlled, all of the springs being in substantially parallel planes.

5. In an automobile, separated sets of leaf springs secured at their butt ends to the body or chassis and at their free ends to the front and rear axles respectively, the springs being arranged at such a downward and rearwardly angle relative to the body or chassis that when the latter is depressed, it will move forwardly relative to the axles substantially the same distance that it is depressed.

In testimony whereof I have signed my name to this specification in the presence of two subscribing witnesses.

CHARLES A. LIEB.

Witnesses:
 F. M. DONSBACH,
 PHILLIPS ABBOTT.